(12) United States Patent
Harasawa

(10) Patent No.: US 7,007,082 B2
(45) Date of Patent: Feb. 28, 2006

(54) MONITORING OF SERVICE LEVEL AGREEMENT BY THIRD PARTY

(75) Inventor: Akio Harasawa, Tokyo (JP)

(73) Assignee: NEC Corporation, Tokyo (JP)

( * ) Notice: Subject to any disclaimer, the term of this patent is extended or adjusted under 35 U.S.C. 154(b) by 779 days.

(21) Appl. No.: 09/956,098

(22) Filed: Sep. 20, 2001

(65) Prior Publication Data
US 2002/0038366 A1 Mar. 28, 2002

(30) Foreign Application Priority Data
Sep. 22, 2000 (JP) ............................. 2000-288751

(51) Int. Cl.
*G06F 15/173* (2006.01)
(52) U.S. Cl. ...................... 709/223; 709/224; 709/225; 709/226
(58) Field of Classification Search ........ 709/223–229; 370/243–245, 248, 250, 259
See application file for complete search history.

(56) References Cited

U.S. PATENT DOCUMENTS

| 5,521,907 | A | * | 5/1996 | Ennis et al. ................. 370/253 |
| 6,058,102 | A | * | 5/2000 | Drysdale et al. ............ 370/252 |
| 6,112,236 | A | | 8/2000 | Dollin et al. ................ 709/224 |
| 6,421,319 | B1 | * | 7/2002 | Iwasaki ....................... 370/230 |
| 6,556,659 | B1 | * | 4/2003 | Bowman-Amuah ........ 379/9.04 |
| 6,711,137 | B1 | * | 3/2004 | Klassen et al. ............. 370/252 |

FOREIGN PATENT DOCUMENTS

| JP | 9-244973 | 9/1997 |
| JP | 09-261254 | 10/1997 |
| JP | 11-136237 | 5/1999 |
| JP | 11-275079 | 10/1999 |

OTHER PUBLICATIONS

Mase, Kenichi et al., Internet Quality and Traffic Management [V Conclusion] *Denshi Joho Tsushin Gakkaishi*, Japan, Institute of Electronics, Information and Communication Engineers, Mar. 25, 2000, vol. 83, pp. 221-227.

* cited by examiner

*Primary Examiner*—Ario Etienne
*Assistant Examiner*—LaShonda Jacobs
(74) *Attorney, Agent, or Firm*—Foley & Lardner LLP

(57) ABSTRACT

A service level agreement (SLA) monitoring system is provided for making fair determination as to an extent to which an SLA is achieved and for facilitating a procedure taken by a user to receive compensation when the SLA is violated. The monitoring system comprises a plurality of service level probing boxes and a monitoring center. Each of the service level probing boxes, which is installed as an interface between each user network and a provider network, monitors user packets to detect whether the SLA is violated, when the user packets flow from an originating user network to the provider network and when the user packets flow from the provider network to a destination user network, and transmits the result of detection to the monitoring center. The monitoring center conducts fact finding for a violation of the SLA based on information from each of the service level probing boxes, and acts as a procedure for claiming compensation in the name of a user in conformity with an SLA contract.

7 Claims, 4 Drawing Sheets

MONITORING OF SERVICE LEVEL AGREEMENT BY THIRD PARTY

BACKGROUND OF THE INVENTION

1. Field of the Invention

The present invention relates to a service level agreement (hereinafter called the "SLA") monitoring system and a monitoring method using the same in a network service scheme in which a plurality of users conclude a contract with a provider, which provides network services using a provider network, for a service level agreement which defines the quality of network services, so that the users utilize the network services by use of a plurality of user networks interconnected through the provider network.

2. Description of the Related Art

In recent years, users who wish to utilize a network service often conclude an SLA contract with a provider which provides the network service for defining the quality of the network service before they begin utilizing the network service.

The SLA provides a variety of criteria for the quality of a network service and sets a guaranteed value for each criterion, such that if the provider violates the SLA, for example, provides the network service of a quality below the guaranteed level, the provider shall compensate the user for damage caused by the SLA violation.

It is anticipated that in the future, it will become more general than in the past that the SLA is executed mutually between providers and users.

However, the SLA which defines the quality of a network service, as mentioned above, has problems as follows.

Since the quality of a network service is presented with a design value of a network system offered by a provider and measurements performed by the provider for supporting the design value, no fair determining means exists for determining to which extent the SLA is achieved.

Upon occurrence of a violation of the SLA such as a degraded network service, interrupted service and so on, the user himself must take the steps necessary to claim compensation for damage, so that the user is burdened with a complicated procedure for claiming the compensation.

SUMMARY OF THE INVENTION

It is an object of the present invention to provide an SLA monitoring system and a monitoring method using the same, which are capable of fairly determining to which extent an SLA is achieved and of facilitating a procedure taken by the user to receive compensation when the SLA is violated.

To achieve the above object, the SLA monitoring system according to the present invention has a plurality of service level probing boxes and a monitoring center.

The plurality of service level probing boxes, which are each disposed as an interface between each of a plurality of user networks and the provider network, monitor the quality and availability of a network service to detect whether the SLA is violated. The monitoring center, connected to each of the plurality of service level probing boxes, conducts fact finding for a violation of the SLA based on the result of detection for the violation of the SLA in each of the plurality of service level probing boxes.

When an SLA contract defines a guaranteed bandwidth, a bandwidth of user packets is measured as the user packets flow from an originating user network to the provider network, at one of the plurality of service level probing boxes disposed as an interface between the originating user network of the user packets and the provider network.

When the SLA contract defines a guaranteed amount of delay, a delay measuring packet is generated and inserted between user packets as the user packets flow from an originating user network to the provider network at one of the plurality of service level probing boxes disposed as an interface between the originating user network and the provider network. Subsequently, the amount of delay in the user packets is measured using the delay measuring packet, and the delay measuring packet is then discarded at one of the plurality of service level probing boxes disposed as an interface between a destination user network of the user packets and the provider network.

Since the monitoring center, in a position of a third party, conducts fact finding for a violation of the SLA, it is possible to fairly determine to which extent the SLA is achieved.

Also, since the monitoring center reports the result of the fact finding for a violation of the SLA to associated user and/or provider, and acts for a procedure for claiming compensation in the name of a user when the SLA is violated, the monitoring center can receive reasonable considerations from the associated provider and/or user, and facilitate a procedure taken by the user to receive compensation.

The above and other objects, features and advantages of the present invention will become apparent from the following description with reference to the accompanying drawings which illustrate examples of the present invention.

BRIEF EXPLANATION OF THE DRAWINGS

FIG. 2 is a diagram showing exemplary states of user packets before and after the user packets pass through a service level probing box (SLPB) shown in FIG. 1, wherein

DESCRIPTION OF PREFERRED EMBODIMENTS

First Embodiment

Figure 1:
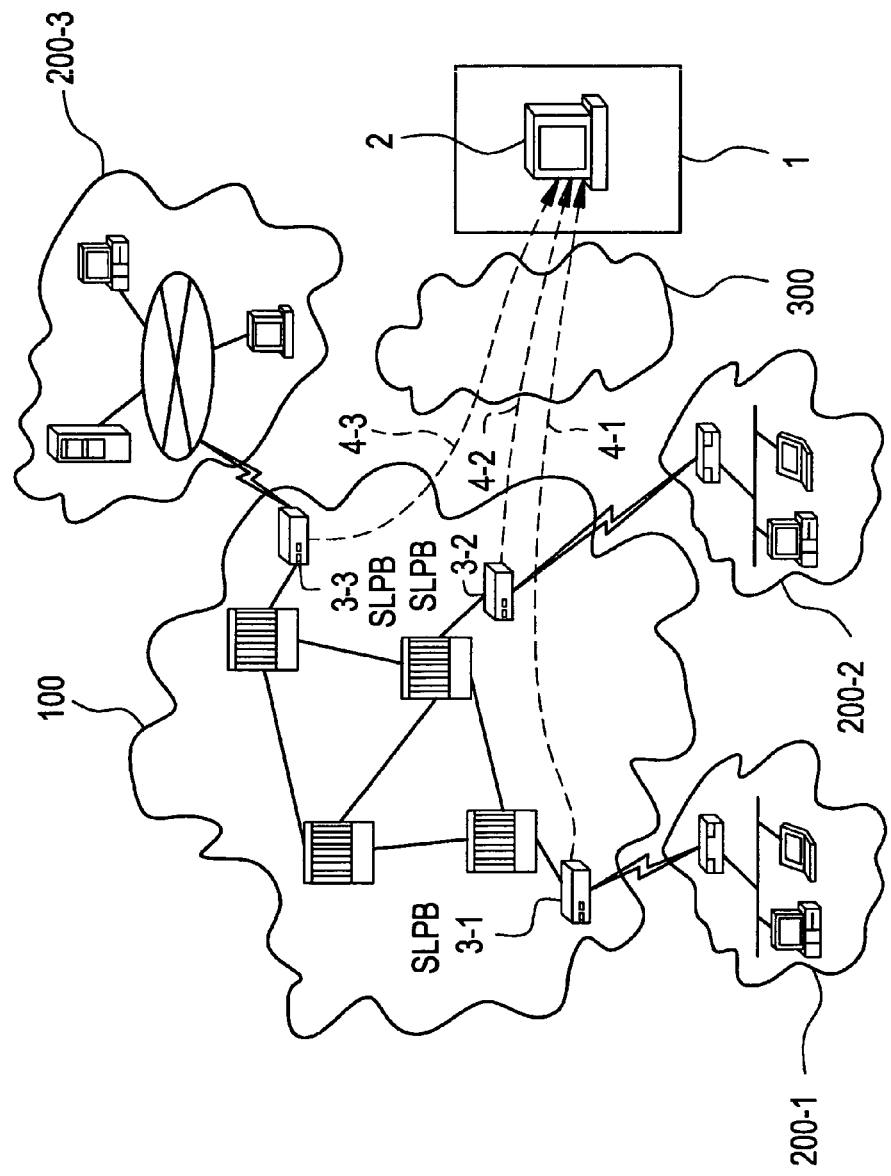
FIG. 1 is a diagram illustrating the configuration of a service level agreement (SLA) monitoring system according to a first embodiment of the present invention.

Referring now to FIG. 1, in a service level agreement (SLA) monitoring system according to a first embodiment of the present invention, networks 200-1–200-3 for use by a plurality of users (hereinafter called the "user network") are interconnected through network 100 for use by a provider (hereinafter called the "provider network"). The users have concluded an SLA contract with the provider, which provides a network service, for utilizing the network service.

In provider network 100, service level probing boxes (hereinafter called "SLPB") 3-1–3-3 are installed as interfaces with user networks 200-1–200-3, respectively. Each of SLPBS 3-1–3-3 is interconnected with workstation 2 within monitoring center 1 through communication line 4-1–4-3 (here, general public communication network 300).

The provider provides the users with a packet exchange service for user packets, which are transmitted and received through user networks 200-1–200-4, using provider network 100.

Each of SLPBs 3-1–3-3 monitors variations in utilization and quality of a network service provided by the provider to detect whether or not the SLA is violated, and sends a report on the detection result to workstation 2 in monitoring center 1 through communication line 4-1–4-3. Specifically, when user packets flow from an originating user network into provider network 100 and when user packets flow from provider network 100 to a destination user network, associated SLPBs 3-1–3-3 monitor the user packets to detect whether or not the SLA is violated.

It should be noted that the contract may be made based on originating and destination user networks, or based only on an originating user network.

The following description will be made on the operation performed by the SLA monitoring system configured as described above for monitoring the SLA.

First described is a method for use with an SLA contract which defines a guaranteed bandwidth, for detecting, measuring and admitting whether or not the bandwidth guaranteed by the contract is exceeded, whether or not any packet has been lost for user traffic for which the guaranteed bandwidth in the contract is observed, and a packet loss rate.

As user packets flow from an originating user network to provider network 100, each of SLPBs 3-1–3-3 monitors the user packets to measure the inflow bandwidth and the number of inflow packets for each contract unit, and calculates the difference between the measured inflow bandwidth and the contracted bandwidth guaranteed by the SLA contract. In the following description, an SLPB which is installed at a point where user packets flow from an originating user network to provider network 100 as an interface between the user network and provider network 100 is called the "entrance SLPB," while an SLPB which is installed at a point where user packets flow from provider network 100 to a destination user network as an interface between the user network and provider network 100 is called the "exit SLPB."

As the result of calculating the difference between the inflow bandwidth and the contracted bandwidth, when the inflow bandwidth exceeds the contracted bandwidth, the entrance SLPB transmits the time at which it measured the difference between the inflow bandwidth and the contract bandwidth, and the value of exceeded bandwidth or measured value of inflow bandwidth to workstation 2 in monitoring center 1. In this way, if any packets are lost, monitoring center 1 admits that the cause/fault of the lost packets lies in the excess bandwidth on the user side.

Figure 2A:
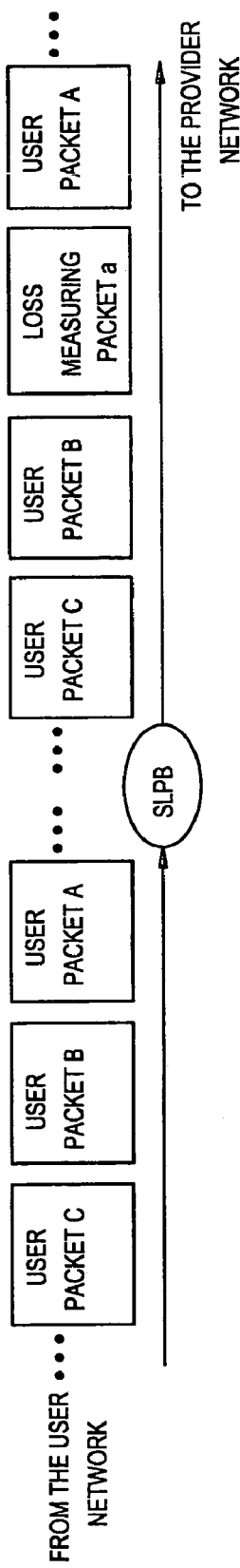
FIG. 2A shows that user packets are routed from a user network to a provider network.

On the other hand, when the inflow bandwidth is equal to or less than the contracted bandwidth, i.e., when the contracted bandwidth is observed, the entrance SLPB generates loss measuring packets to determine whether or not loss of packets occurs, inserts the loss measuring packet between user packets as shown in FIG. 2A to be transmitted to provider network 100. In FIG. 2A, loss measuring packet a is inserted between user packet A and user packet B.

The loss measuring packets inserted between user packets should satisfy the following conditions:

(1) The loss measuring packet appears to be a user packet, when viewed from provider network 100. Specifically, the same addresses as those of an originating and a destination user network, described in the header of the user's user packet, are described in the header of the loss measuring packet. Therefore, the provider of a network service should handle the loss measuring packet together with true user packets so as to satisfy the SLA.

(2) Each of the loss measuring packets is embedded with a serial number which is allocated in conformity to the order in which user packets and the loss measuring packets are routed into provider network 100. The allocation of serial numbers is managed for each contract unit. Here, the contract unit must satisfy that an originating and a destination user network of user packets are identical to each other, i.e., the entrance SLPB and exit SLPB are identical. In this event, user packets also correspond to serial numbers which, however, are not embedded in the user packets. For example, in FIG. 2A, when user packet A, loss measuring packet a, user packet B and user packet C correspond to serial numbers "1," "2," "3" and "4," respectively, loss measuring packet a is embedded with serial number "2" whereas user packets A, B, C are not embedded with their serial numbers.

(3) Each of the loss measuring packets includes an identifier which enables an exit SLPB to determine that this packet is a loss measuring packet but not a true user packet. Measuring packets inserted between user packets at an entrance SLPB include a delay measuring packet for measuring a propagation delay time, later described, and so on, other than the loss measuring packet. Since the delay measuring packet also includes an identifier, the identifier included in the loss measuring packet must enable an exit SLPB to recognize that the associated packet is not a true user packet but a measuring packet and that the packet is a loss measuring packet among other measuring packets.

(4) The frequency of inserting loss measuring packets is limited such that even the sum of a bandwidth of true user packets and a bandwidth in which loss measuring packets are inserted therefore is equal to or less than a contracted bandwidth defined by the SLA.

The loss measuring packets inserted between user packets at the entrance SLPB so as to satisfy the foregoing conditions pass through provider network 100 as if they were user packets that are routed from a user network, and subsequently reach the exit SLPB.

The exit SLPB separately monitors user packets flowing from provider network 100 to a destination user network and the loss measuring packets for each contract unit, and counts the total number of the user packets and loss measuring packets.

Further, the exit SLPB examines whether each of the packets includes an identifier to determine whether or not the packet is a measuring packet, and, if determining that the packet is a measuring packet, examines the included identifier to determine whether this measuring packet is a loss measuring packet inserted between user packets for purposes of confirming the occurrence of lost packets. Then, if it is revealed that this measuring packet is a loss measuring packet, the exit SLPB extracts a serial number embedded in the loss measuring packet, discards the loss measuring packet, and lets only user packets flow to a destination user network, as shown in FIG. 2B.

Subsequently, the exit SLPB calculates, for each contract unit, a difference between a serial number embedded in the most recently received loss measuring packet and a serial number embedded in the last received loss measuring packet previous to this loss measuring packet. Then, the exit SLPB compares the difference with the number of packets which have been received after reception of the last received loss measuring packet previous to the most recently received loss measuring packet to check whether the difference value is equal to the number of packets. The exit SLPB determines that no user packet has been lost if the difference is equal to the number of packets, and determines that certain user packet(s) has been lost if not equal (the number of received packets<the difference between the serial numbers).

Figure 2B:
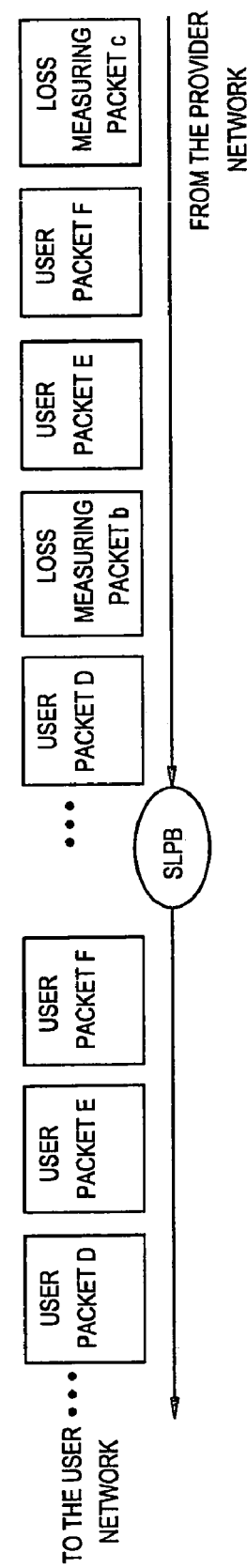
FIG. 2B shows that user packets are routed from the provider network to the user network.

Specifically, assume that the exit SLPB receives packets from provider network 100, for example, in an order as shown in FIG. 2B. When user packet D, loss measuring packet b, user packet E, user packet F and loss measuring packet c are corresponded to serial numbers "1," "2," "3," "4" and "5," respectively, the exit SLPB calculates a difference "3", between the serial number "5" embedded in most recently received loss measuring packet c and the serial number "2" embedded in last received loss measuring packet b previous to loss measuring packet c. Then, the exit SLPB compares this difference "3" with the number of packets received after reception of loss measuring packet b (user packet E, user packet F and loss measuring packet c). In this event, since the difference matches the number of packets, the exit SLPB determines that no user packet has been lost.

In this way, it is possible to detect whether or not any packet has been lost, so that a packet loss rate can also be calculated for a fixed period.

Further, by previously setting a minimum interval at which loss measuring packets are inserted, it is also possible to detect that the network service has been shut down in case no measuring packet has arrived for more than the minimum interval with a margin considered for fluctuations in assumed propagation delay time.

Next described will be a method for use with an SLA contract which defines guaranteed amounts of propagation delay and its fluctuations for measuring, detecting and admitting the amounts of delay and delay fluctuations, guaranteed by the contract, as well as whether or not a bandwidth guaranteed by the contract is exceeded.

An entrance SLPB generates delay measuring packets to measure the amount of delay, when user packets flow from an originating user network into provider network 100, and inserts the delay measuring packets between user packets.

If the SLA contract includes an item related to a guaranteed bandwidth in addition to an item related to a guaranteed amount of delay, the entrance SLPB will measure the bandwidth of user packets which flow into provider network 100 for each contract unit. Conditions which must be satisfied by the delay measuring packets inserted between user packets differ as follows depending on whether or not the SLA contract includes the item related to the guaranteed bandwidth.

1. When SLA contract includes item related to guaranteed bandwidth in addition to item related to guaranteed amount of delay:

(1) The frequency of inserting delay measuring packets is limited such that even the sum of a bandwidth for user packets and a bandwidth in which delay measuring packets therefor are inserted is equal to or less than a contracted bandwidth defined by the SLA.

(2) The delay measuring packet appears to be one of user packets which should satisfy the SLA between the user and the provider, when viewed from provider network 100. Specifically, the same addresses as those of an originating and a destination user network, described in the header of the user's user packet, are described in the header of the delay measuring packet.

(3) At an entrance SLPB which is positioned at the start point of a delay measuring section, a time (time stamp) at which the entrance SLPB inserted a delay measuring packet is inserted into the packet.

(4) The delay measuring packet includes an identifier which enables an exit SLPB to determine that the packet is a delay measuring packet but not a true user packet. The identifier included in the delay measuring packet must enable the exit SLPB to recognize that the associated packet is not a true user packet but a measuring packet, and that the packet is a delay measuring packet among other measuring packets.

2. When SLA contract does not include item related to guaranteed bandwidth in addition to item related to guaranteed amount of delay;

(1) The delay measuring packet appears to be one of user packets which should satisfy the SLA between the user and the provider, when viewed from provider network 100. Specifically, the same addresses as those of an originating and a destination user network, described in the header of the user's user packet, are described in the header of the loss measuring packet.

(2) At an entrance SLPB which is positioned at the start point of a delay measuring section, a time (time stamp) at which the entrance SLPB inserted a delay measuring packet is inserted into the packet.

(3) The delay measuring packet includes an identifier which enables an exit SLPB to determine that the packet is a delay measuring packet but not a true user packet. The identifier included in the delay measuring packet must enable the exit SLPB to recognize that the associated packet is not a true user packet but a measuring packet, and that the packet is a delay measuring packet among other measuring packets.

The delay measuring packets inserted between user packets at the entrance SLPB so as to satisfy the foregoing conditions pass through provider network 100 as if they were user packets flowing from a user network, and subsequently reach the exit SLPB.

The exit SLPB examines whether each of the packets includes an identifier to determine whether or not the packet is a measuring packet, and, if determining that the packet is a measuring packet, examines the included identifier to determine whether this measuring packet is a delay measuring packet inserted between user packets for purposes of measuring the amount of delay. When it is revealed that the packet is a delay measuring packet, the exit SLPB extracts a time stamp embedded in the delay measuring packet, discards this delay measuring packet, and lets only user packets flow to a destination user network.

Subsequently, based on the difference between a time inserted in the time stamp extracted from the delay measuring packet and a time at which the delay measuring packet was received, the exit SLPB calculates the amount of propagation delay of user packets.

Further, by previously setting a minimum interval at which delay measuring packets are inserted, it is also possible to detect that the network service has been shut down in case no delay measuring packet has arrived for more than the minimum interval with a margin considered for fluctuations in assumed propagation delay time.

The aforementioned information on situations such as whether the guaranteed bandwidth in the contract is observed, whether any packet has been lost, whether any propagation delay has occurred, and whether the network service has been shut down, is transmitted from each of SLPBs 3-1–3-3 to workstation 2 in monitoring center 1 through communication lines 4-1–4-3.

In this way, monitoring center 1 can keep track of whether the network service is provided in conformity with the SLA, and record information on the network service shut-down and degraded network service. This record is valuable information which objectively indicates the degree to which the network service provider observes the SLA, or serves as neutral/quantitative fact finding information which may be employed for a contention between a provider and a user.

Therefore, monitoring center 1 can receive reasonable considerations from providers and users by reporting the record to them. Monitoring center 1 can also act for a procedure for claiming compensation in conformity to the SLA contract in the name of a user, when a provider violates the SLA, to receive rewards for the act for the compensation claiming procedure.

Advantageously, in the first embodiment, since any of SLPBS, and facilities and communication means between SLPBs and monitoring center 1 is owned and operated by monitoring center 1 which is in a position of third party, the fairness is maintained in the result of observation on to which extent the SLA is achieved.

It is therefore possible to establish the base for fair SLA guarantees which is indispensable for expanding the provision/utilization of network services, and to ensure reasonable profits for both network service providers and users under the SLA.

Second Embodiment

Figure 3:
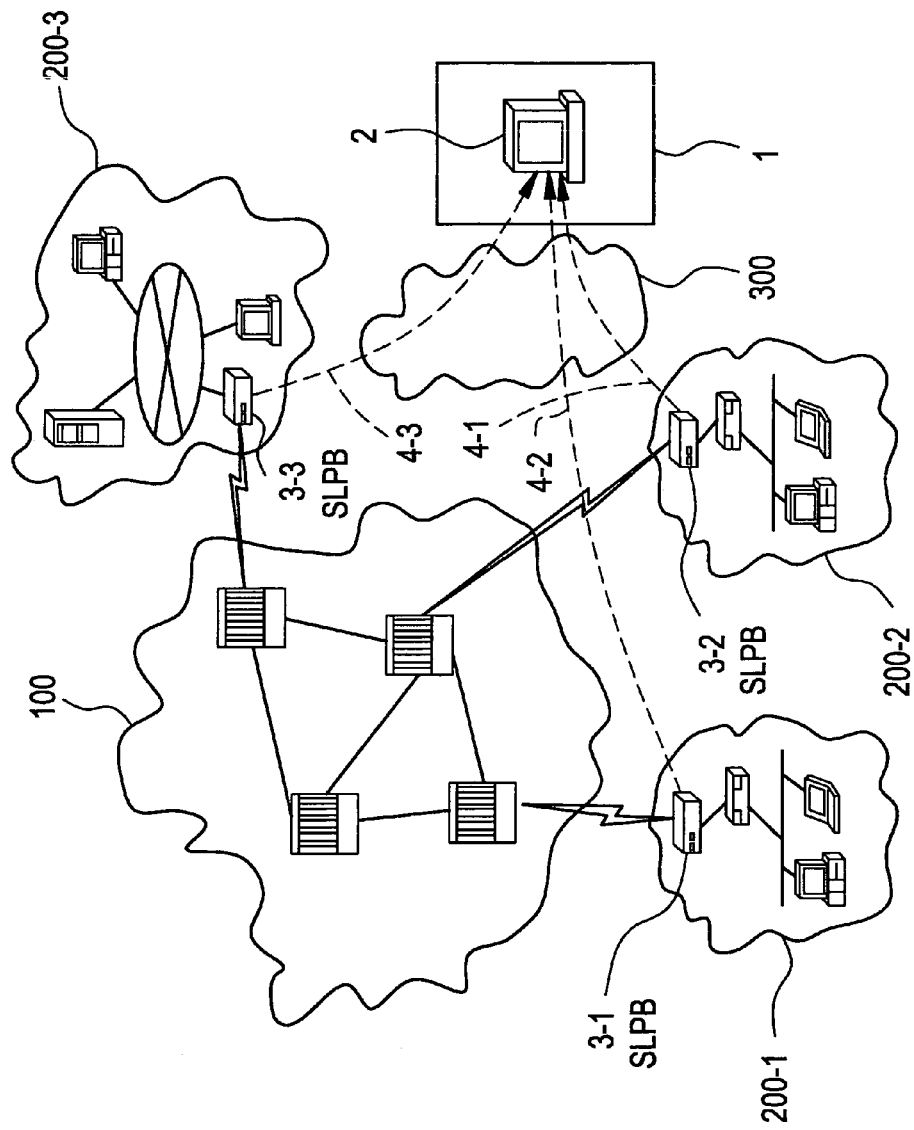
FIG. 3 is a diagram illustrating a second embodiment of a third party operated SLA monitoring system according to the present invention.

Referring to FIG. 3, an SLA monitoring system according to a second embodiment of the present invention differs from the first embodiment illustrated in FIG. 1 in that service level probing boxes (SLPBS) 3-1–3-3 are installed in respective user networks 200-1–200-3 as interfaces with provider network 100. Since the rest of the configuration is similar to that of the first embodiment, description thereof is omitted.

In the second embodiment, since SLPBs 3-1–3-3 are installed in respective user networks 200-1–200-3, a service provided by the monitoring system can be utilized at each user's will.

Third Embodiment

Figure 4:
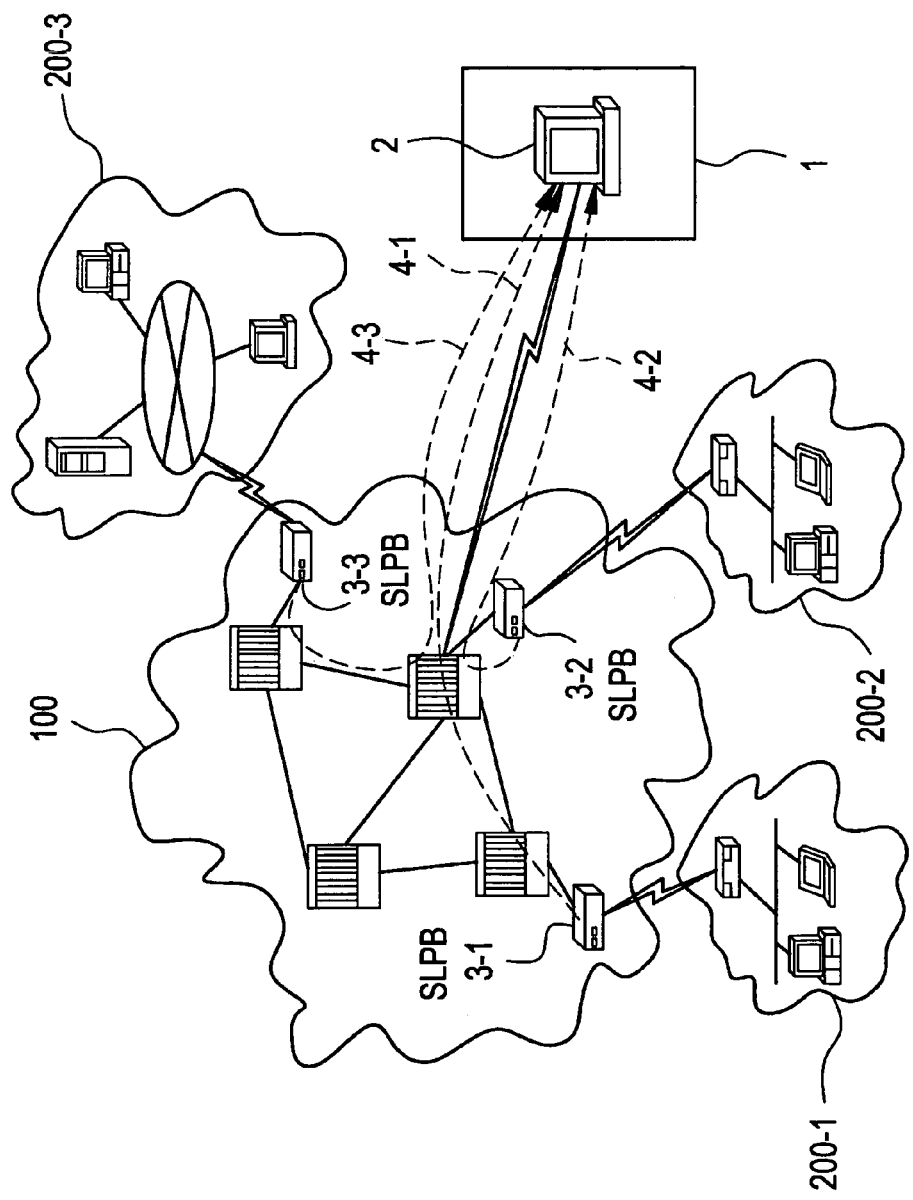
FIG. 4 is a diagram illustrating a third embodiment of a third party operated SLA monitoring system according to the present invention.

Referring to FIG. 4, an SLA monitoring system according to a third embodiment of the present invention differs from the first embodiment illustrated in FIG. 1 in that each of service level probing boxes (SLPBS) 3-1–3-3 and workstation 2 in monitoring center 1 are interconnected through provider network 100. Since the rest of the configuration is similar to that of the aforementioned first embodiment, description thereon is omitted.

In the third embodiment, since a general public line need not be used, the rate for the public line need not be paid separately, thereby making it possible to save the operation cost for maintaining the monitoring system.

While preferred embodiments of the present invention have been described using specific terms, such description is for illustrative purposes only, and it is to be understood that changes and variations may be made without departing from the spirit or scope of the following claims.

What is claimed is:

1. A system for monitoring packet loss of user packets sent from a user network and addressed for delivery to the user network via a provider network, forward user packets moving in a forward direction from the user network to the provider network and then in a return direction from the provider network to the user network as return user packets, the system comprising:
   a service level probing box; and
   a monitoring center in communications with the service level probing box,
   wherein the service level probing box receives from the user network the forward user packets and outputs the forward user packets to the provider network;
   wherein the service level probing box further outputs to the provider network loss measuring packets comprising a first loss measuring packet and a second loss measuring packet, each of the loss measuring packets (1) addressed for delivery to the user network via the provider network, (2) including an identifier enabling a receiving portion of the service level probing box to recognize the loss measuring packets as being distinct from the return user packets, and (3) further including an inserted count of the forward user packets and outputted loss measuring packets previously output by the service level probing box to the provider network;
   wherein the service level probing box outputs the loss measuring packets such that at least one of the forward user packets separates the first and the second loss measuring packets;
   wherein the service level probing box receives from the provider network the return user packets and the loss measuring packets;
   wherein the service level probing box examines the return user packets and the received loss measuring packets to separate the received loss measuring packets from the return user packets and extracts from each of the received first and the received second loss measuring packets the inserted count;
   wherein the service level probing box counts the return user packets and the received loss measuring packets received from the provider network between a time when the service level probing box receives the first loss measuring packet and a time when the service level probing box receives the second loss measuring packet;
   wherein the service level probing box performs monitoring of packet loss based on the count and each of the inserted counts in the received first and the received second loss measuring packets;
   wherein the service level probing box sends results of the monitoring to the monitoring center; and
   wherein the service level probing box outputs to the user network the return user packets but not the received loss measuring packets.

2. The system according to claim 1, wherein each of the loss measuring packets further appear, to the provider network, as being indistinct from the user packets.

3. The system according to claim 1, wherein the monitoring performed comprises comparing the count against a subtraction of the inserted count extracted from the received first loss measuring packet from the inserted count extracted from the received second loss measuring packet.

4. The system according to claim 1, wherein the monitoring center, upon finding that the results of the monitoring constitute a violation of a service level agreement between a corresponding user of the user network and a corresponding provider of the provider network, acts to claim compensation from the corresponding provider on behalf of the corresponding user.

5. The system according to claim 1, wherein the service level probing box is disposed in the provider network and communicates with the monitoring center through a public communication network.

6. The system according to claim 1, wherein the service level probing box is disposed in the user network and communicates with the monitoring center through a public communication network.

7. The system according to claim 1, wherein the service level probing box is disposed in the provider network and communicates with the monitoring center through the provider network.

* * * * *